(12) United States Patent
Ikarashi et al.

(10) Patent No.: US 10,523,422 B2
(45) Date of Patent: Dec. 31, 2019

(54) TAMPERING DETECTION DEVICE, TAMPERING DETECTION METHOD AND PROGRAM

(71) Applicant: NIPPON TELEGRAGH AND TELEPHONE CORPORATION, Chiyoda-ku (JP)

(72) Inventors: Dai Ikarashi, Tokyo (JP); Ryo Kikuchi, Tokyo (JP); Koki Hamada, Tokyo (JP); Koji Chida, Tokyo (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 398 days.

(21) Appl. No.: 14/759,352

(22) PCT Filed: Jan. 16, 2014

(86) PCT No.: PCT/JP2014/050651
§ 371 (c)(1),
(2) Date: Jul. 6, 2015

(87) PCT Pub. No.: WO2014/112550
PCT Pub. Date: Jul. 24, 2014

(65) Prior Publication Data
US 2015/0358152 A1 Dec. 10, 2015

(30) Foreign Application Priority Data
Jan. 17, 2013 (JP) .................................. 2013-006692

(51) Int. Cl.
*H04L 9/06* (2006.01)
*H04L 9/00* (2006.01)
(Continued)

(52) U.S. Cl.
CPC .............. *H04L 9/0643* (2013.01); *G09C 1/00* (2013.01); *H04L 9/004* (2013.01); *H04L 9/008* (2013.01); *H04L 9/3242* (2013.01)

(58) Field of Classification Search
CPC .......... G09C 1/00; H04L 9/004; H04L 9/008; H04L 9/0643; H04L 9/3242
See application file for complete search history.

(56) References Cited

U.S. PATENT DOCUMENTS 8,515,058 B1 * 8/2013 Gentry .................... H04L 9/008
380/28
8,837,715 B2 * 9/2014 Troncoso Pastoriza ......................
H04L 9/008
380/28
(Continued)

FOREIGN PATENT DOCUMENTS

WO 2008 001628 1/2008

OTHER PUBLICATIONS

Obana, S., et al "Almost Optimum Secret Sharing Schemes Secure Against Cheating for Arbitrary Secret Distribution", ASIACRYPT, vol. 4284 of Lecture Notes in Computer Science, (2006), pp. 364-379.*

(Continued)

*Primary Examiner* — Benjamin E Lanier
(74) *Attorney, Agent, or Firm* — Oblon, McClelland, Maier & Neustadt, L.L.P.

(57) ABSTRACT

The present invention can be efficiently applied to secure computation and can achieve a low probability of successful tampering. A tampering detection device includes a parameter storage storing parameters $\alpha_{ijk}$ for uniformly mapping from two elements of a ring $R^q$ to one element of the ring $R^q$, a division part 12 dividing N values $a_0, \ldots, a_{N-1}$ into sets of q values to generate value vectors $A_0, \ldots, A_{\rho-1}$, a generation part 14 generating a checksum c, and a verifica- (Continued)

tion part 15 comparing a verification value generated by using the value vectors $A_0, \ldots, A_{\rho-1}$ with the checksum c to determine whether or not any of the values $a_0, \ldots, a_{N-1}$ has been tampered with. Here, N and q are integers greater than or equal to 2 and $\rho$ is a minimum integer greater than or equal to N/q.

7 Claims, 3 Drawing Sheets

(51) Int. Cl.
*G09C 1/00* (2006.01)
*H04L 9/32* (2006.01)

(56) References Cited

U.S. PATENT DOCUMENTS

| | | | |
|---|---|---|---|
| 2005/0210260 A1* | 9/2005 | Venkatesan | H04L 9/0643 713/180 |
| 2008/0168564 A1* | 7/2008 | Lerouge | G06F 21/64 726/26 |
| 2008/0208560 A1* | 8/2008 | Johnson | G06F 21/14 703/22 |
| 2009/0204802 A1* | 8/2009 | Araki | H04L 9/085 713/1 |
| 2013/0301827 A1* | 11/2013 | Mueller | H04L 9/28 380/28 |
| 2013/0339728 A1* | 12/2013 | Ikarashi | H04L 9/085 713/164 |
| 2015/0180666 A1* | 6/2015 | Minematsu | H04L 9/3242 380/44 |

OTHER PUBLICATIONS

International Search Report dated Mar. 11, 2014 in PCT/JP2014/050651 Filed Jan. 16, 2014.

* cited by examiner

TAMPERING DETECTION DEVICE, TAMPERING DETECTION METHOD AND PROGRAM

TECHNICAL FIELD

The present invention relates to a tampering detection technique for detecting data tampering in secure computation in which data processing is performed while concealing data.

BACKGROUND ART

An existing checksum technique used for tampering detection is the one described in Non-patent literature 1. The checksum technique described in Non-patent literature 1 includes addition and multiplication and can be efficiently applied to secure computation.

The checksum technique described in Non-patent literature 1 uses random numbers $r \in F$ to generate a check sum c of values $a_0, \ldots, a_{N-1} \in F$ according to Formula 1 given below, where F is a field.

$$c := \sum_{0 \leq i < N} a_i r^{i+1} \qquad \text{[Formula 1]}$$

In Non-patent literature 1, the checksum c is verified according to Formula 2 given below.

$$\sum_{0 \leq i < N} a_i r^{i+1} - c \qquad \text{[Formula 2]}$$

If Formula 2 yields 0, then it is determined that none of the values $a_0, \ldots, a_{N-1}$ have been tampered with. If Formula 2 yields a value other than 0, it is determined that at least one of the values $a_0, \ldots, a_{N-1}$ has been tampered with.

PRIOR ART LITERATURE

Non-Patent Literature

Non-patent literature 1: S. Obana and T. Araki, "Almost optimum secret sharing schemes secure against cheating for arbitrary secret distribution", ASIACRYPT, Vol. 4284 of Lecture Notes in Computer Science, pp. 364-379, 2006.

SUMMARY OF THE INVENTION

Problem to be Solved by the Invention

In the tampering detection technique described in Non-patent literature 1, the probability of successful tampering is $N/|F|$ when the field F is predetermined. Here, N represents the number of pieces of data for which the checksum is generated and $|*|$ represents the number of the elements of *. Thus, since the probability of successful tampering is proportional to the number N of pieces of data, the probability of successful tampering increases as the number of pieces of data for which a checksum is generated increases.

An object of the present invention is to provide a tampering detection technique that can be efficiently applied to secure computation and can achieve a lower probability of successful tampering.

Means to Solve the Problem

To solve the problem described above, a tampering detection device of the present invention includes: a parameter storage storing a parameter $\alpha_{ijk}$ for uniformly mapping from a ring R to a ring $R^q$, where $i=0, \ldots, q-1$, $j=0, \ldots, q-1$, and $k=0, \ldots, q-1$; a division part dividing N values $a_0, \ldots, a_{N-1}$ into sets of q values, starting from the first value, to generate value vectors $A_0, \ldots, A_{\rho-1}$; a generation part using the value vectors $A_0, \ldots, A_{\rho-1}$ to generate a checksum c including addition and multiplication, where vector multiplication is a function f defined by the formula given below; a verification part comparing a verification value with the check sum c to determine whether or not any of the values $a_0, \ldots, a_{N-1}$ has been tampered with, the verification value being generated using vector multiplication which is the function f; where N and q are integers greater than or equal to 2 and $\rho$ is a minimum integer greater than or equal to N/q.

$$f(\vec{x}, \vec{y}) := \left( \sum_{j,k<q} \alpha_{0,j,k} x_j y_k, \ldots, \sum_{j,k<q} \alpha_{q-1,j,k} x_j y_k \right) \qquad \text{[Formula 3]}$$

Effects of the Invention

The tampering detection technique of the present invention can be efficiently applied to secure computation and can achieve a lower probability of successful tampering.

DETAILED DESCRIPTION OF THE EMBODIMENTS

Figure 1:
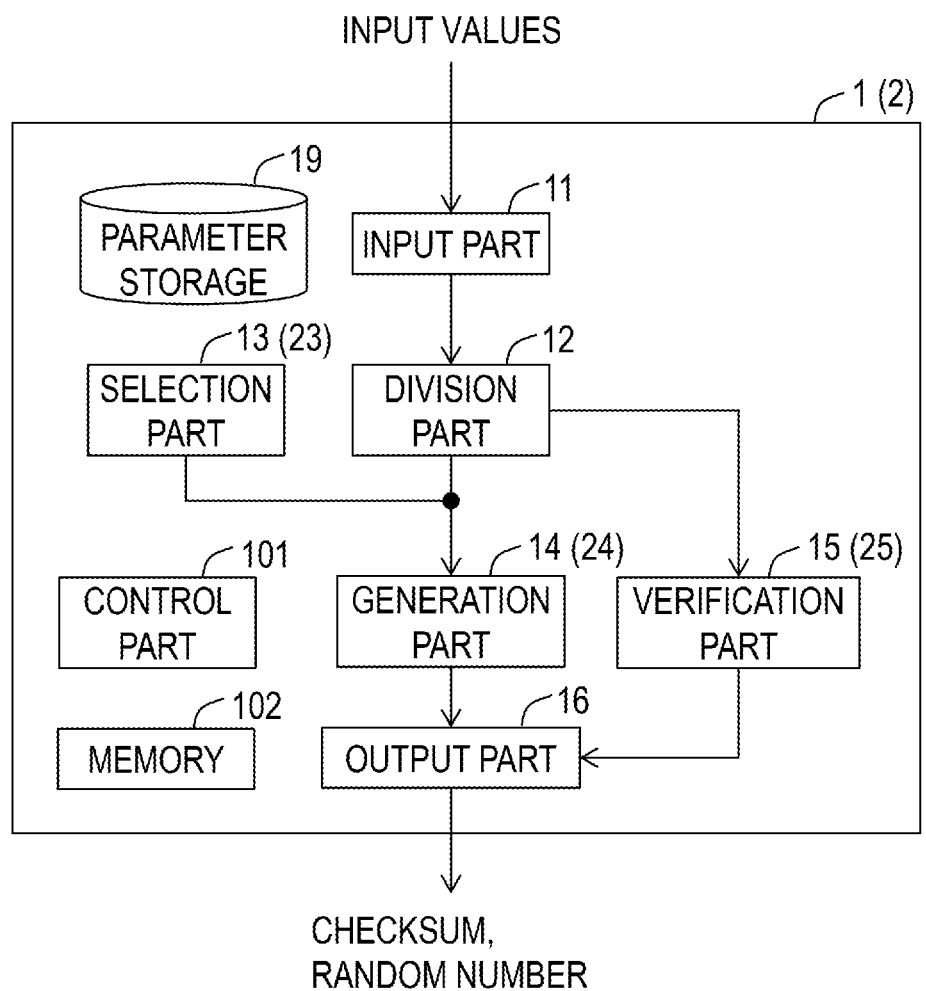
FIG. 1 is a diagram illustrating a functional configuration of a tampering detection device.

Embodiments of the present invention will be described below in detail. Like components are given like reference numerals throughout the drawings and repeated description of those components will be omitted.

[First Embodiment]

A first embodiment of the present invention is an embodiment in which the present invention is applied to a checksum technique including addition and multiplication described in Non-patent literature 1.

<Configuration>

An exemplary configuration of a tampering detection device 1 according to first embodiment will be described with reference to FIG. 1. The tampering detection device 1 includes a control part 101, a memory 102, an input part 11, a division part 12, a selection part 13, a generation part 14, a verification part 15, an output part 16 and a parameter storage 19. The tampering detection device 1 is a specialized device configured by installing a special program in a known or dedicated computer including a CPU (Central Processing Unit) and a RAM (Random Access Memory) among other components, for example. The tampering detection device 1 executes processes under the control of the control part 101. Data input in the tampering detection device 1 and data obtained as a result of the execution of the processes are stored in the memory 102 and the data stored in the memory 102 is retrieved and used in other processes as needed. The parameter storage 19 may be a main memory such as a RAM (Random Access Memory), an auxiliary storage configured of a hard disk or a semiconductor memory such as an optical disc or flash memory, middleware such as a relational database or a key value store, for example.

<Checksum Generation Process>

Figure 2:
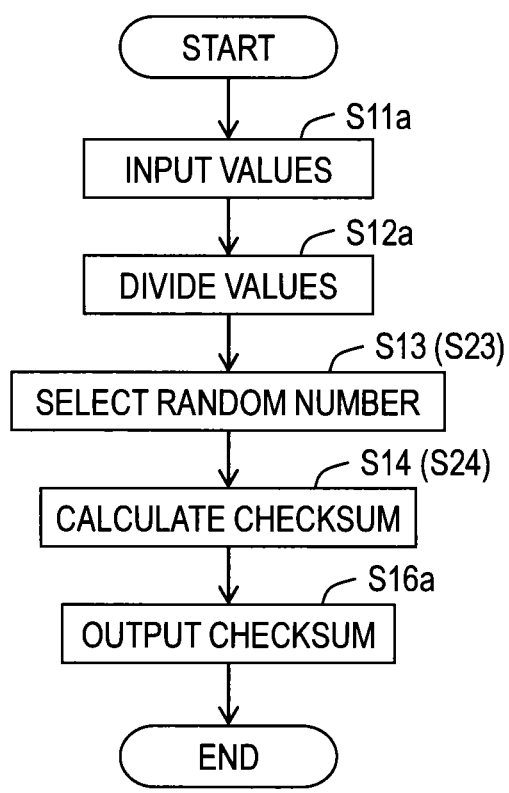
FIG. 2 is a diagram illustrating a process flow for generating a checksum.

An exemplary operation of a checksum generation process executed by the tampering detection device 1 of this embodiment will be described in detail in the order of procedure with reference to FIG. 2. In the following description, N and q are integers greater than or equal to 2, $\rho$ is a minimum integer greater than or equal to N/q and R represents a ring.

Parameters $\alpha_{ijk}$ for uniformly mapping from two elements of a ring $R^q$ to one element of the ring $R^q$ (where i=0, ..., q−1; j=0, ..., q−1; and k=0, ..., q−1) is stored beforehand in the parameter storage 19. The parameter $\alpha_{ijk}$ can be obtained by determining a ring R and the degree q. While there can be a plurality of parameters $\alpha_{ijk}$, it is desirable to choose it parameters $\alpha_{ijk}$ that include $q^3$ values including the most 0s. For example, efficient tampering detection can be achieved by choosing such parameters $\alpha_{ijk}$ that R is a field and $R^q$ is an expansion field of the field R.

N values $a_0, \ldots, a_{N-1} \in R$ are input into the input part 11 of the tampering detection device 1 (step S11a). The input values $a_0, \ldots, a_{N-1}$ are input into the division part 12. While the values $a_0, \ldots, a_{N-1}$ may be any information, the values $a_0, \ldots, a_{N-1}$ may be ciphertext of homomorphic encryption or shares of secret sharing. Homomorphic encryption is an encryption method that has homomorphism and enables calculation of the sum or product of original plain text from ciphertext without decryption. An example of homomorphic encryption is ElGamal cryptosystem. Details of the ElGamal cryptosystem are described in documents such as 'T. ElGamal, "A public key cryptosystem and signature scheme based on discrete logarithms", IEEE Transactions on Information Theory, vol. 31, no. 4, pp. 469-472, 1985 (Reference literature 1)'. Secret sharing is a technique by which data is transformed into multiple shares so that the original data can be reconstructed by using a certain number of shares or more but none of the original data can be reconstructed by using any number of shares less than the certain number. One example is Shamir's secret sharing. Details of Shamir's secret sharing are described in documents such as 'A. Shamir, "How to share a secret", Communications of the ACM, vol. 22, issue 11, pp. 612-613, 1979 (Reference literature 2)'.

The division part 12 divides the N values $a_0, \ldots, a_{N-1}$ into sets of q values, starting from the first value, to generate p value vectors $A_0, \ldots, A_{\rho-1}$ (step S12a). The generated value vectors $A_0, \ldots, A_{\rho-1}$ are input into the generation part 14. If the number of elements of the last value vector $A_{\rho-1}$ is not q as a result of the division, the value vector is padded with an arbitrary value so that the number of elements becomes q. For example, if the last vector is padded with 0 and N=11 and q=2, then $a_0, \ldots, a_{10}$ may be divided as $A_0:=(a_0, a_1)$, $A_1:=(a_2, a_3)$, $A_2:=(a_4, a_5), \ldots, A_5:=(a_{10}, 0)$.

The selection part 13 selects a random number $r \in R^q$ (step S13). The selected random number r is input into the generation part 14. The selection part 13 may select one random number r at random at a time or may select a random number r from among a plurality of values generated and stored in the memory 102 beforehand in accordance with a rule. Furthermore, a random number may be a pseudorandom number generated from any encryption method or a hash function, instead of a true random number.

The generation part 14 uses the value vectors $A_0, \ldots, A_{\rho-1}$ and the random number r to generate a checksum c (step S14). The generated checksum c and the random number r are input into the output part 16. Specifically, the generation part 14 calculates the checksum c in accordance with Formula 4 given below.

$$c := \sum_{0 \le i < \rho} A_i r^{i+1} \qquad \text{[Formula 4]}$$

Here the multiplication of the vectors is performed by using a function f defined by Formulas 5.

$$f(\vec{x}, \vec{y}) := f_0(\vec{x}, \vec{y}), \ldots, f_{q-1}(\vec{x}, \vec{y}) \qquad \text{[Formula 5]}$$

$$f_i(\vec{x}, \vec{y}) := \sum_{j,k<q} \alpha_{i,j,k} x_j y_k$$

The output part 16 outputs the checksum c and the random number r (step S16a).

<Checksum Verification Process>

Figure 3:
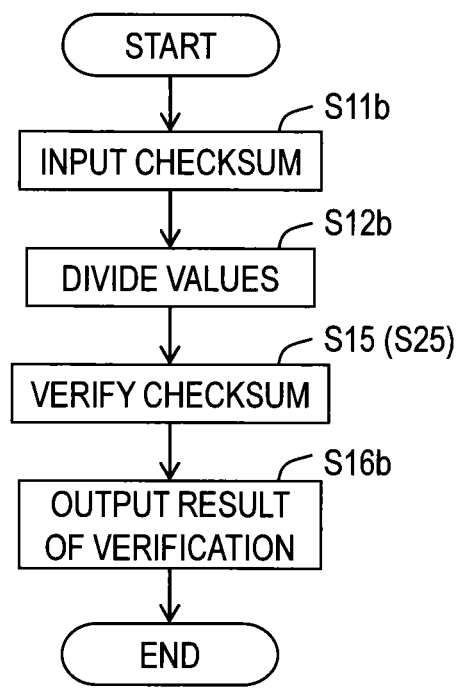
FIG. 3 is a diagram illustrating a process flow for checksum verification.

An exemplary operation of a checksum verification process executed by the tampering detection device 1 of this embodiment will be described in detail in the order of procedure with reference to FIG. 3.

N values $a_0, \ldots, a_{N-1} \in R$, a random number $r \in R^q$ and a checksum c are input in the input part 11 of the tampering detection device 1 (step S11b). The input values $a_0, \ldots, a_{N-1}$ are input into the division part 12. The input random number r and checksum c are input into the verification part 15.

The division part 12 divides the values $a_0, \ldots, a_{N-1}$ into sets of q values, starting from the first value, to generate value vectors $A_0, \ldots, A_{\rho-1}$ (step S12b). The method for the division is the same as the processing by the division part 12 in the checksum generation process. The processing at step S12b can be omitted by configuring to store the value vectors $A_0, \ldots, A_{\rho-1}$ generated in the checksum generation process.

The verification part 15 uses the value vectors $A_0, \ldots, A_{\rho-1}$ and the checksum c to generate a verification result indicating whether or not any of the values $a_0, \ldots, a_{N-1}$ have been tampered with (step S15). The verification result is input into the output part 16.

Specifically, the verification part 15 evaluates Formula 6 given below. If Formula 6 yields 0, the verification part 15 determines that none of the values $a_0, \ldots, a_{N-1}$ has been tampered with. If Formula 6 yields a value other than 0, the verification part 15 determines that at least one of the values $a_0, \ldots, a_{N-1}$ has been tampered with.

$$\sum_{0 \le i < \rho} A_i r^{i+1} - c \qquad \text{[Formula 6]}$$

Here the multiplication of the vectors is performed by using the function f defined by Formulas 5 as in the checksum generation process.

The output part 16 outputs the verification result (step S16*b*).

<Effect>

The checksum technique described in Non-patent literature 1 provides a probability of successful tampering of N/p at best, where N is the number of pieces of data for which a checksum is generated and p is the number of elements of a ring R. Assuming that the ring R is fixed and p=2, for example, the tampering detection has little effect.

The checksum technique in the first embodiment can achieve a low probability of successful tampering by calculation using value vectors $A_0, \ldots, A_{\rho-1} \in R^q$ as a unit. For example, if the ring R is a prime filed, i.e. Z/pZ, where Z is an integer ring, p is a prime number and q is an integer greater than or equal to 2, a probability of successful tampering as low as approximately $N/p^q$ can be achieved. Therefore an arbitrary low probability of successful tampering can be achieved by using a degree of field extension q which can be set to an arbitrary value.

[Second Embodiment]

A second embodiment of the present invention is an embodiment in which the present invention is applied to a checksum that can achieve a lower probability of successful tampering than the probability that can be achieved by the checksum described in Non-patent literature 1.

<Configuration>

An exemplary configuration of a tampering detection device 2 of second embodiment will be described with reference to FIG. 1. The configuration of the tampering detection device 2 of the second embodiment is similar to the configuration of the tampering detection device 1 of the first embodiment with the difference being processes performed by a selection part and a generation part. The tampering detection device 2 includes a control part 101, a memory 102, an input part 11, a division part 12, a selection part 23, a generation part 24, a verification part 25, an output part 16 and a parameter storage 19. The tampering detection device 2 is a specialized device configured by installing a special program in a known or dedicated computer including a CPU (Central Processing Unit) and a RAM (Random Access Memory) among other components, for example. The tampering detection device 2 executes processes under the control of the control part 101. Data input in the tampering detection device 2 and data obtained as a result of the execution of the processes are stored in the memory 102 and the data stored in the memory 102 are retrieved and used in other processes as needed.

<Checksum Generation Process>

An exemplary operation of a checksum generation process executed by the tampering detection device 2 of this embodiment will be described in detail in the order of procedure with reference to FIG. 2. In the following description, M, N, and q are integers greater than or equal to 2, M<N, p is a minimum integer greater than or equal to N/q, and R represents a ring.

The process from step S11*a* through S12*a* is the same as that in the first embodiment and therefore the description of steps S11*a* through S12*a* will be omitted here.

The selection part 23 of this embodiment selects M random numbers $r_0, \ldots, r_{M-1} \in R^q$ (step S23). The selected random numbers $r_0, \ldots, r_{M-1}$ are input into the generation part 24. The selection part 23 may select the M random numbers $r_0, \ldots, r_{M-1}$ at random at a time or may select the M random numbers $r_0, \ldots, r_{M-1}$ from among a plurality of values stored in the memory 102 beforehand in accordance with a predetermined rule.

The generation part 24 of this embodiment uses value vectors $A_0, \ldots, A_{\rho-1}$ and the random numbers $r_0, \ldots, r_{M-1}$ to generate a checksum c (step S24). The generated checksum c and the random numbers $r_0, \ldots, r_{M-1}$ are input into the output part 16. Specifically, the generation part 24 calculates the checksum c according to Formula 7 given below.

$$c := \sum_{i<\rho} A_i \prod_{j<M} r_j^{d(i,j)} \qquad \text{[Formula 7]}$$

Here the multiplication of the vectors is performed by using a function f defined by Formulas 5 as in the checksum generation process.

In Formula 7, the function d(i, j) is a function that determines the order of the j-th random number $r_j$ for the i-th value $a_i$. It is assumed here that $d(i, j) \neq d(i', j)$ is satisfied with any j (where j<M), where i and i' are natural numbers and $i \neq i'$. In other words, combinations of the orders of the random numbers $r_0, \ldots, r_{M-1}$ need to be combinations that do not overlap each other for each $A_i$.

For example, if $\rho=3$ and M=2, then $c=A_0 r_0 + A_1 r_1 + A_2 r_0 r_1$ may be calculated. If $\rho=4$ and M=2, then $c=A_0 r_0 + A_1 r_1 + A_2 r_0 r_1 + A_3 r_0^2 r_1$ may be calculated or $c=A_0 r_0^2 r_1 + A_1 r_0 r_1 + A_2 r_1 + A_3 r_0$ may be calculated.

While M may be any value that is greater than or equal to 2 and less than $\rho$, the highest efficiency is provided by choosing a minimum integer that exceeds $\log_2 \rho$ as M because all of the orders of random numbers $r_0, \ldots, r_{M-1}$ can be less than or equal to 1. For example, if $\rho=7$ and M=3, then $c=A_0 r_0 + A_1 r_1 + A_2 r_0 r_1 + A_3 r_2 + A_4 r_0 r_2 + A_5 r_1 r_2 + A_6 r_0 r_1 r_2$ can be calculated and the orders of all of the random numbers can be less than or equal to 1.

The output part 16 outputs the checksum c and the random numbers $r_0, \ldots, r_{M-1}$ (step S16*a*).

<Checksum Verification Process>

An exemplary operation of a checksum verification process executed by the tampering detection device 2 of this embodiment will be described in detail in the order of procedure with reference to FIG. 3.

The process from step S11*b* through step S12*b* is the same as that in the first embodiment and therefore the description of the steps S11*a* through S12*b* will be omitted here.

The verification part 25 uses the value vectors $A_0, \ldots, A_{\rho-1}$ the random numbers $r_0, \ldots, r_{M-1}$ and the checksum c to generate a verification result indicating whether or not any of the values $a_0, \ldots, a_{N-1}$ has been tampered (step S25). The verification result is input into the output part 16.

Specifically, the verification part 25 evaluates Formula 8 given below. If Formula 8 is true, the verification part 25 determines that none of the values $a_0, \ldots, a_{N-1}$ has been tampered with. If Formula 8 is false, the verification part 25 determines that at least one of the values $a_0, \ldots, a_{N-1}$ has been tampered with.

$$c = \sum_{i<\rho} A_i \prod_{j<M} r_j^{d(i,j)} \qquad \text{[Formula 8]}$$

Here the multiplication of the vectors is performed by using a function f defined by Formulas 5 as in the checksum generation process.

The function d(i,j) in Formula 8 is the same as the function d(i,j) in Formula 7.

The output part 16 outputs the result of the verification (step S16b).

<Effect>

If the checksum in the second embodiment is calculated using values $a_0, \ldots, a_{N-1} \in R$ as a unit, the probability of successful tampering is logN/p at best, where N is the number of pieces of data for which the checksum is generated and p is the number of elements of the ring R. Although this probability is lower than the probability achieved by the checksum technique described in Non-patent literature 1, the tampering detection has little effect if the ring R is fixed and p=2, for example.

By calculating the checksum in the second embodiment using value vectors $A_0, \ldots, A_{\rho-1} \in R^q$ as a unit, a low probability of successful tampering can be achieved. For example, a probability of successful tampering of approximately $logN/p^q$ can be achieved, where Z is an integer ring, p is a prime number, q is an integer greater than or equal to 2, and the ring R is a prime field, Z/pZ. Therefore, an arbitrary low probability of successful tampering can be achieved by using a degree of field extension q which can be set to an arbitrary value.

[Example Application]

The tampering detection technique of the present invention can find a wide variety of applications. For example, the technique can be used when ciphertext generated by homomorphic encryption or share data generated by secret sharing is entrusted to a server managed by a third party. In such a case, there are risks such as the risk of the data being tampered with by a malicious attacker accessing the server, the risk of the entrusted data being maliciously tampered with by the server itself, and the risk of data being tampered with by malware infecting the server. Generating and adding a checksum of the present invention to data to be entrusted enables the server to perform data processing on the concealed data while concealing the data and prevent data tampering.

[Program and Recording Medium]

It would be understood that the present invention is not limited to the embodiments described above and modifications can be made without departing from the spirit of the present invention. Furthermore, the processes described in the embodiments may be performed not only in time sequence as is written or may be performed in parallel with one another or individually, depending on the throughput of the apparatuses that perform the processes or requirements.

If processing functions of any of the devices described in the embodiments are implemented by a computer, the processing of the functions that the devices should include is described in a programs. The program is executed on the computer to implement the processing functions of the devices on the computer.

The programs describing the processing can be recorded on a computer-readable recording medium. The computer-readable recording medium may be any recording medium such as a magnetic recording device, an optical disc, a magneto-optical recording medium, and a semiconductor memory.

The program is distributed by selling, transferring, or lending a portable recording medium on which the program is recorded, such as a DVD or a CD-ROM. The program may be stored on a storage device of a server computer and transferred from the server computer to other computers over a network, thereby distributing the program.

A computer that executes the program first stores the program recorded on a portable recording medium or transferred from a server computer into a storage device of the computer. When the computer executes the processes, the computer reads the program stored on the recording medium of the computer and executes the processes according to the read program. In another mode of execution of the program, the computer may read the program directly from a portable recording medium and execute the processes according to the program or may execute the processes according to the program each time the program is transferred from the server computer to the computer. Alternatively, the processes may be executed using a so-called ASP (Application Service Provider) service in which the program is not transferred from a server computer to the computer but process functions are implemented by instructions to execute the program and acquisition of the results of the execution. Note that the program in this mode encompasses information that is provided for processing by an electronic computer and is equivalent to the program (such as data that is not direct commands to a computer but has the nature that defines processing of the computer).

While the inventive device is configured by causing a computer to execute a predetermined program in the embodiments described above, at least some of the processes may be implemented by hardware.

What is claimed is:

1. A tampering detection device comprising:
   circuitry configured to
   store parameters $\alpha_{ijk}$ for uniformly mapping from two elements of a ring $R^q$ to one element of the ring $R^q$, where i=0, ..., q−1, j=0, ..., q−1, and k=0, ..., q−1;
   divide N values $a_0, \ldots, a_{N-1}$ into sets of q values, starting from the first value, to generate value vectors $A_0, \ldots, A_{\rho-1}$;
   select a random number r from the ring $R^q$;
   generate a checksum c by performing addition and multiplication using the value vectors $A_0, \ldots, A_{\rho-1}$ by calculating $$c := \sum_{0 \le i < \rho} A_i r^{i+1}, \qquad \text{[Formula 10]}$$

where vector multiplication is a function f using the parameters $\alpha_{ijk}$ defined by $$f(\vec{x}, \vec{y}) := \sum_{j,k<q} \alpha_{0,j,k} x_j y_k, \ldots, \sum_{j,k<q} \alpha_{q-1,j,k} x_j y_k; \qquad \text{[Formula 16]}$$

determine that none of the values $a_0, \ldots, a_{N-1}$ has been tampered with if the formula given below yields 0, and determine that at least one of the values $a_0, \ldots, a_{N-1}$ has been tampered with if the formula given below yields a value other than 0

$$\sum_{0 \le i < \rho} A_i r^{i+1} - c, \qquad \text{[Formula 11]}$$

where vector multiplication is the function f; and
where N and q are integers greater than or equal to 2 and ρ is a minimum integer greater than or equal to N/q.

2. A tampering detection device comprising:
circuitry configured to
store parameters $\alpha_{ijk}$ for uniformly mapping from two elements of a ring $R^q$ to one element of the ring $R^q$, where i=0, ..., q−1, j=0, ..., q−1 and k=0, ..., q−1;
divide N values $a_0, \ldots, a_{N-1}$ into sets of q values, starting from the first value, to generate value vectors $A_0, \ldots, A_{\rho-1}$;
select M random numbers $r_0, \ldots, r_{M-1}$ from the ring $R^q$;
generate a checksum c by performing addition and multiplication using the value vectors $A_0, \ldots, A_{\rho-1}$ by calculating $$c := \sum_{i<\rho} A_i \prod_{j<M} r_j^{d(i,j)}, \qquad \text{[Formula 12]}$$

where vector multiplication is a function f using the parameters $\alpha_{ijk}$ defined by $$f(\vec{x}, \vec{y}) := \sum_{j,k<q} \alpha_{0,j,k} x_j y_k, \ldots, \sum_{j,k<q} \alpha_{q-1,j,k} x_j y_k; \qquad \text{[Formula 17]}$$

determine that none of the values $a_0, \ldots, a_{N-1}$ has been tampered with if the formula given below is true, and determine that at least one of the values $a_0, \ldots, a_{N-1}$ has been tampered with if the formula given below is false $$c = \sum_{i<\rho} A_i \prod_{j<M} r_j^{d(i,j)}, \qquad \text{[Formula 13]}$$

where vector multiplication is the function f; and
where N and q are integers greater than or equal to 2, $\rho$ is a minimum integer greater than or equal to N/q, and M is an integer greater than or equal to 2, M<N, i and i' are natural numbers, i≠i', and j<M, with any of j is a function such that d(i, j)≠d(i', j).

3. A method for detecting tampering implemented by a tampering detection device, the method comprising:
by circuitry of the tampering detection device:
dividing N values $a_0, \ldots, a_{N-1}$ into sets of q values, starting from the first value, to generate value vectors $A_0, \ldots, A_{\rho-1}$;
selecting a random number r from the ring $R^q$;
generating a checksum c by performing addition and multiplication using the value vectors $A_0, \ldots, A_{\rho-1}$ by calculating $$c := \sum_{0 \le i < \rho} A_i r^{i+1}, \qquad \text{[Formula 18]}$$

where vector multiplication is a function f using the parameters $\alpha_{ijk}$ defined by $$f(\vec{x}, \vec{y}) := \sum_{j,k<q} \alpha_{0,j,k} x_j y_k, \ldots, \sum_{j,k<q} \alpha_{q-1,j,k} x_j y_k; \qquad \text{[Formula 14]}$$

determining that none of the values $a_0, \ldots, a_{N-1}$ has been tampered with if the formula given below yields 0, and determining that at least one of the values $a_0, \ldots, a_{N-1}$ has been tampered with if the formula given below yields a value other than 0

$$\sum_{0 \le i < \rho} A_i r^{i+1} - c, \qquad \text{[Formula 19]}$$

where
vector multiplication is the function f; and
where N and q are integers greater than or equal to 2, $\rho$ is a minimum integer greater than or equal to N/q, $\alpha_{ijk}$ are parameters for uniformly mapping from two elements of a ring $R^q$ to one element of the ring $R^q$, i=0, ..., q−1, j=0, ..., q−1, and k=0, ..., q−1.

4. A non-transitory computer readable medium including computer executable instructions that make a tampering detection device perform a method, the method comprising:
dividing N values $a_0, \ldots, a_{N-1}$ into sets of q values, starting from the first value, to generate value vectors $A_0, \ldots, A_{\rho-1}$;
selecting a random number r from the ring $R^q$;
generating a checksum c by performing addition and multiplication using the value vectors $A_0, \ldots, A_{\rho-1}$ by calculating $$c := \sum_{0 \le i < \rho} A_i r^{i+1}, \qquad \text{[Formula 20]}$$

where vector multiplication is a function f using parameters $\alpha_{ijk}$ defined by $$f(\vec{x}, \vec{y}) := \sum_{j,k<q} \alpha_{0,j,k} x_j y_k, \ldots, \sum_{j,k<q} \alpha_{q-1,j,k} x_j y_k; \qquad \text{[Formula 15]}$$

determining that none of the values $a_0, \ldots, a_{N-1}$ has been tampered with if the formula given below yields 0, and determining that at least one of the values $a_0, \ldots, a_{N-1}$ has been tampered with if the formula given below yields a value other than 0

$$\sum_{0 \le i < \rho} A_i r^{i+1} - c, \qquad \text{[Formula 21]}$$

where
vector multiplication is the function f; and
where N and q are integers greater than or equal to 2, $\rho$ is a minimum integer greater than or equal to N/q, $\alpha_{ijk}$ are parameters for uniformly mapping from two elements of a ring $R^q$ to one element of the ring $R^q$, i=0, ..., q−1, j=0, ..., q−1, and k=0, ..., q−1.

5. The tampering detection device according to claim 1, wherein the ring R is Z/pZ, where Z is an integer ring and p is a prime number.

6. A method for detecting tampering implemented by a tampering detection device, the method comprising:
by circuitry of the tampering detection device:
dividing N values $a_0, \ldots, a_{N-1}$ into sets of q values, starting from the first value, to generate value vectors $A_0, \ldots, A_{\rho-1}$;

selecting M random numbers $r_0, \ldots, r_{M-1}$ from the ring $R^q$;

generating a checksum c including addition and multiplication using the value vectors $A_0, \ldots, A_{\rho-1}$ by calculating $$c := \sum_{i<\rho} A_i \prod_{j<M} r_j^{d(i,j)},\qquad\text{[Formula 22]}$$

where vector multiplication is a function f using the parameters $\alpha_{ijk}$ defined by $$f(\vec{x}, \vec{y}) := \left(\sum_{j,k<q} \alpha_{0,j,k} x_j y_k, \ldots, \sum_{j,k<q} \alpha_{q-1,j,k} x_j y_k\right);\qquad\text{[Formula 23]}$$

determining that none of the values $a_0, \ldots, a_{N-1}$ has been tampered with if the formula given below is true, and determining that at least one of the values $a_0, \ldots, a_{N-1}$ has been tampered with if the formula given below is false $$c = \sum_{i<\rho} A_i \prod_{j<M} r_j^{d(i,j)},\qquad\text{[Formula 24]}$$

where vector multiplication is the function f; and where N and q are integers greater than or equal to 2, $\rho$ is a minimum integer greater than or equal to N/q, M is an integer greater than or equal to 2, M<N, i and i' are natural numbers, i≠i', and j<M, with any of j is a function such that $d(i, j) \neq d(i', j)$, $\alpha_{ijk}$ are parameters for uniformly mapping from two elements of a ring $R^q$ to one element of the ring $R^q$, $i=0, \ldots, q-1$, $j=0, \ldots, q-1$, and $k=0, \ldots, q-1$.

7. A non-transitory computer readable medium including computer executable instructions that make a tampering detection device perform a method, the method comprising:

dividing N values $a_0, \ldots, a_{N-1}$ into sets of q values, starting from the first value, to generate value vectors $A_0, \ldots, A_{\rho-1}$;

selecting M random numbers $r_0, \ldots, r_{M-1}$ from the ring $R^q$;

generating a checksum c including addition and multiplication using the value vectors $A_0, \ldots, A_{\rho-1}$ by calculating $$c := \sum_{i<\rho} A_i \prod_{j<M} r_j^{d(i,j)},\qquad\text{[Formula 25]}$$

where vector multiplication is a function f using parameters $\alpha_{ijk}$ defined by $$f(\vec{x}, \vec{y}) := \left(\sum_{j,k<q} \alpha_{0,j,k} x_j y_k, \ldots, \sum_{j,k<q} \alpha_{q-1,j,k} x_j y_k\right);\qquad\text{[Formula 26]}$$

determining that none of the values $a_0, \ldots, a_{N-1}$ has been tampered with if the formula given below is true, and determining that at least one of the values $a_0, \ldots, a_{N-1}$ has been tampered with if the formula given below is false $$c = \sum_{i<\rho} A_i \prod_{j<M} r_j^{d(i,j)},\qquad\text{[Formula 27]}$$

where vector multiplication is the function f; and where N and q are integers greater than or equal to 2, $\rho$ is a minimum integer greater than or equal to N/q, M is an integer greater than or equal to 2, M<N, i and i' are natural numbers, i≠i', and j<M, with any of j is a function such that $d(i, j) \neq d(i', j)$, $\alpha_{ijk}$ are parameters for uniformly mapping from two elements of a ring $R^q$ to one element of the ring $R^q$, $i=0, \ldots, q-1$, $j=0, q-1$, and $k=0, \ldots, q-1$.

* * * * *